United States Patent [19]
Laughlin et al.

[11] Patent Number: 4,477,269
[45] Date of Patent: Oct. 16, 1984

[54] CYCLONIC SEPARATOR APPARATUS

[75] Inventors: Sidney J. Laughlin, 2411 S. 61st, Apt. H4, Temple, Tex. 76501; Ralph J. Claypool, Austin, Tex.

[73] Assignee: Sidney J. Laughlin, Rogers, Tex.

[21] Appl. No.: 191,701

[22] Filed: Sep. 29, 1980

Related U.S. Application Data

[62] Division of Ser. No. 94,470, Nov. 15, 1979, Pat. No. 4,268,294.

[51] Int. Cl.³ .................. B01D 46/04; B01D 50/00
[52] U.S. Cl. .................................. 55/290; 55/317; 55/337; 55/338
[58] Field of Search .................. 55/290, 293, 301, 317, 55/328, 337, 338, 351, 400, 431; 209/30, 31, 144

[56] References Cited

U.S. PATENT DOCUMENTS

| | | | |
|---|---|---|---|
| 969,074 | 8/1910 | Morse | 55/290 |
| 1,856,685 | 5/1932 | Anderson | 55/338 |
| 2,795,291 | 6/1957 | Pierce | 55/293 |
| 3,486,313 | 12/1969 | Thomas | 55/301 |
| 3,618,302 | 11/1971 | Cornett | 55/337 |
| 3,909,222 | 9/1975 | Caughlin et al. | 209/31 |
| 4,090,857 | 5/1978 | Ferri et al. | 55/337 |

FOREIGN PATENT DOCUMENTS 392441   1/1923   Fed. Rep. of Germany ...... 209/144

*Primary Examiner*—David L. Lacey
*Attorney, Agent, or Firm*—Glaser, Griggs & Schwartz

[57] ABSTRACT

Cyclonic separator apparatus for extracting entrained lint particles from an effluent air stream prior to discharge into the atmosphere. A rotary filter is combined with a cyclonic separator of the type having a vertical settling chamber for separating relatively dense fiber product from airborne lint entrained in a product stream. The separator apparatus includes a housing forming an air stream inlet, a lint discharge outlet and a clean air outlet. A rotatable screen is interposed between the air stream inlet and the clean air outlet whereby the entrained lint is accumulated on the screen as the effluent air stream flows through the screen for discharge into the atmosphere. The accumulated lint deposit is presented to the lint discharge outlet as the screen turns. A first fan blower is coupled to the separator for inducing an upwardly moving inner vortex for entraining the airborne lint, and coupled to the filter inlet for discharging the entrained lint onto the rotatable screen. A second fan blower is coupled to the lint discharge port for creating a suction force which cleans the accumulated lint deposit from the rotating screen, and connected to the separator for returning the lint deposit to the settling chamber of the separator for recycling. In a preferred embodiment, the rotating screen comprises a drum having a cylindrical screen surface for accumulating a lint deposit, with one end of the drum being covered by a screen, and the other end being open for discharge of the effluent air stream into the atmosphere.

1 Claim, 4 Drawing Figures

CYCLONIC SEPARATOR APPARATUS

This is a division of application Ser. No. 094,470, filed Nov. 15, 1979, now U.S. Pat. No. 4,268,294.

BACKGROUND OF THE INVENTION

1. Field of the Invention

The present invention relates generally to mineral fiber production, and in particular to apparatus for limiting the emission of airborne byproduct material which is incidental to the manufacture of fiber products.

2. Description of the Prior Art

In the art of producing mineral fiber, a spinning unit is utilized for fiberizing molten slag with air or steam. The fiber is conveyed through a blow chamber or collection chamber by down draft fans to a conveyer belt where it is removed by various methods and put into a conventional bagger. The disadvantage of this arrangement is that since it is not a closed system, the lint or airborne flywool byproduct cannot be completely contained, thereby allowing a large quantity of fugitive airborne particles to be emitted into the atmosphere and contributing to pollution of the environment. Because of its damaging ecological effect, this airborne, fugitive fly byproduct must be captured or recovered before the air stream in which it is entrained is discharged into the atmosphere.

The uncontrolled emission of these airborne particles into the atmosphere presents formidable problems because of the increasing emphasis on environmental quality which has led to surveillance and regulation by federal and local authorities. Federal and local legislation in this area no longer permit uncontrolled emissions from mineral fiber plants. Clean air legislation regulates the acceptable amount of particulate material and the constituency of effluent gases from such operations. Failure to abide by the regulatory acts can result in penalties as well as the imposition of permanent injunctions against such operation. Further, new operators must demonstrate in pilot operations that such emissions fall below the established minimum level before a permit for continuous full scale operation will be granted.

In view of the damaging effect of uncontrolled emissions on the ecology, the increasingly tighter controls imposed on such operations by federal and local authorities, and in view of the increasing demand for mineral fiber products, there is an urgent need for new and improved equipment which limit such emissions to safe levels while allowing the mineral fiber process to be operated efficiently on a large scale to meet product demand.

SUMMARY OF OBJECTS OF THE INVENTION

It is, therefore, the principal object of the present invention to provide apparatus for extracting entrained lint particles from an effluent air stream prior to discharge into the atmosphere.

A related object of the invention is to provide a separator apparatus in which airborne lint particles entrained within an effluent stream are efficiently removed from the stream prior to discharge into the atmosphere, and thereafter returned to the separator for recycling.

Yet another object of the invention is to provide a closed system for producing mineral fiber product in which airborne lint particles entrained with the product stream are carefully controlled at all times whereby fiber product and the effluent air stream carrying the product can be discharged with virtually no emission of fugitive lint particles from the system.

SUMMARY OF THE INVENTION

The foregoing objects are provided by a cyclonic separator apparatus of the type having a vertical settling chamber for separating relatively dense fiber product from airborne lint entrained in a product stream. The separator apparatus includes a housing forming an air stream inlet, a lint discharge outlet and a clean air outlet. A rotatable screen is interposed between the air stream inlet and the clean air outlet whereby the entrained lint is accumulated on the screen as the effluent air stream flows through the screen for discharge into the atmosphere. The accumulated lint deposit is presented to the lint discharge outlet as the screen turns. A first fan blower is coupled to the separator for inducing an upwardly moving inner vortex for entraining the airborne lint, and is coupled to the filter inlet for discharging the entrained lint onto the rotatable screen. A second fan blower is coupled to the lint discharge port for creating a suction force which cleans the accumulated lint deposit from the rotating screen, and is connected to the separator for returning the lint deposit to the settling chamber of the separator for recycling.

In a preferred embodiment, the rotating screen comprises a drum having a cylindrical screen surface for accumulating a lint deposit, with one end of the drum being covered by a screen, and the other end being open for discharge of the effluent air stream into the atmosphere. The fiber product is discharged from the cyclonic separator through a rotary lock valve. The product stream is completely closed at all times and is conveyed through conduits which are maintained at a pressure below atmospheric, thereby inhibiting the emission of lint and other particulate material.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

DETAILED DESCRIPTION OF THE PREFERRED EMBODIMENT

Figure 1:
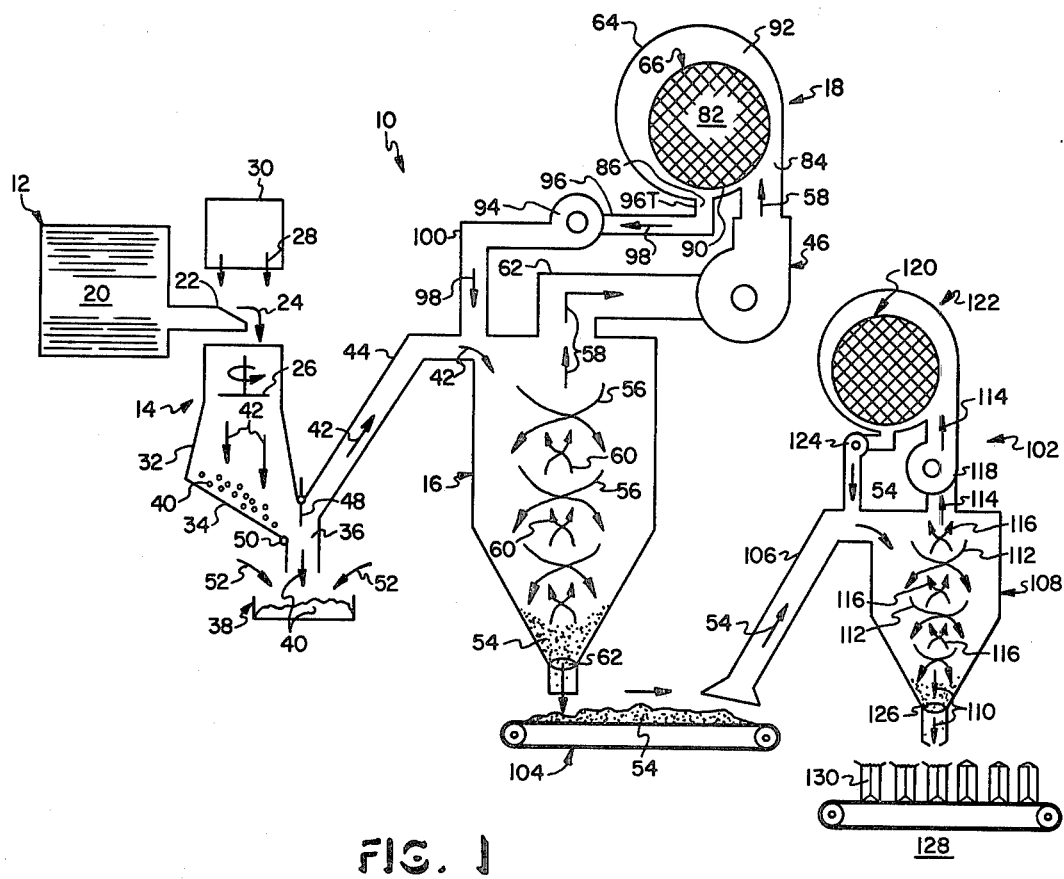
FIG. 1 is a schematic view of a mineral fiber manufacturing system constructed according to the teachings of the invention.

In the description which follows, like parts are marked throughout the specification and drawing with the same reference numerals, respectively. The drawings are not necessarily to scale and in some instances portions have been exaggerated in order to more clearly depict certain features of the invention.

Figure 2:
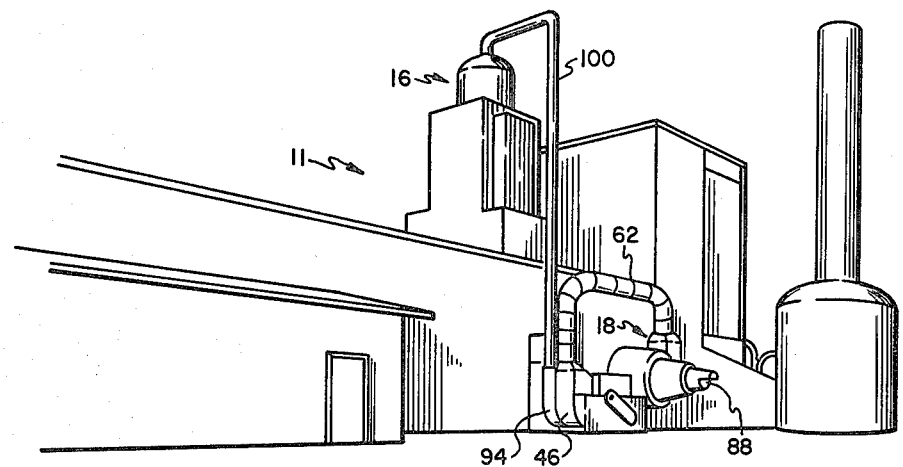
FIG. 2 is a perspective view of a mineral fiber manufacturing plant incorporating the system shown in FIG. 1.

Referring now to FIGS. 1 and 2 of the drawing, a system 10 for producing mineral fiber product from a stream of molten slag in a plant enclosure 11 is disclosed. The system includes as major components a cupola 12, a spinner 14 for attenuating the slag to produce the mineral fiber product, a cyclonic separator 16 for settling out the relatively dense fiber product from the airborne flywool or lint particles, and a rotary filter assembly 18 for recovering the airborne flywool entrained in air discharged from the separator, thereby inhibiting the release of fugitive flywool particles into the atmosphere.

Molten slag 20 is tapped from the cupola 12 through a spout 22. A stream 24 of the molten slag issues through the spout into the open top of the slag spinner 14. The stream of molten slag falls onto the rotating blades of a spinner 26. At the same time, back pressure air flow indicated by the arrows 28 is directed across the spinner by an air ring 30. In response to the resultant forces imparted to the slag by the spinner 26 and the back pressure air flow 28, the stream of slag 24 is divided into multiple streams and are projected at a high velocity into a water cooled cone 32. As the finely divided streams of slag accelerate through the cone 32, the leading mass cools and solidifies as "shot" at the forward end of the fiber trailing behind it. This produces the desired elongated fiber configuration. This fiber elongating process is generally referred to herein as "attenuation".

It should be understood that other attenuating methods may be used to good advantage to produce the fiber product. For example, the slag may be attenuated solely by the action of a centrifugal force as imparted by the spinner 26 or solely by an aerodynamic force, as imparted by the air ring 30, or by a combination of the two as illustrated in FIG. 1. The aerodynamic force may be applied to the slag by high speed, high temperature gaseous jets of heated air or other gases, for example steam.

The "shot" produced by the attenuation of the slag comprises small irregular, but often spherical granules or nodules of molten slag or rock. The shot is detrimental to the quality of the mineral fiber produced, therefore it is removed from the product flow by allowing it to fall under the influence of gravity along a slide 34 where it is discharged through a damper opening 36 into a shot bin 38.

As a result of the attenuation process, a large amount of airborne mineral wool particles are created which do not initially agglomerate with the mineral fiber bulk. Because of its damaging ecological effect, this airborne, fugitive fly byproduct must be captured or recovered before the air stream in which it is entrained is discharged into the atmosphere.

Figure 3:
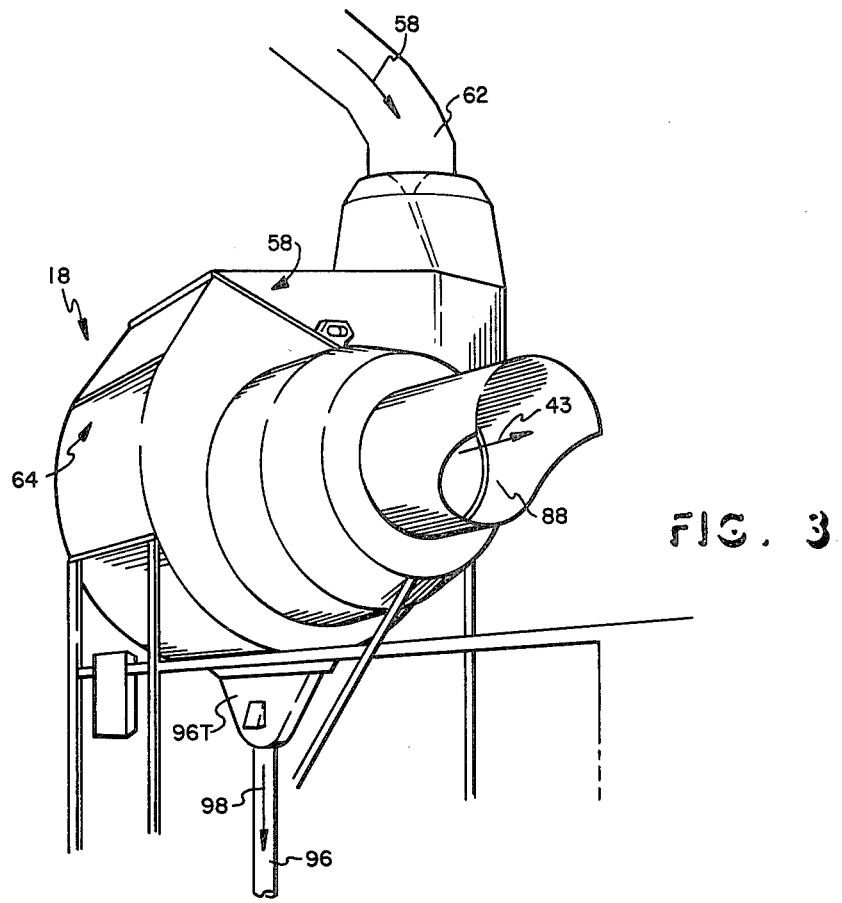
FIG. 3 is a perspective, operational view of a filter assembly.

The bulk mineral fiber product and the mineral wool fly byproduct are referred to collectively as rough product designated by the arrow 42, and the effluent air stream in which they are entrained in designated by the arrow 43 (FIG. 3). The rough product combination 42 is conveyed to the cyclonic separator 16 through a collector conduit 44. A draft is induced through the collector conduit 44 by a fan blower 46. The rate at which the rough product 42 is withdrawn from the cooling cone 32 is controlled by a vertical slide damper 48 located at the entrance to the collector conduit 44. A damper 50 mounted in the shot discharge opening 36 controls the volume and velocity of cooling air flow 52.

The collector conduit 44 is arranged to discharge the entrained mineral fiber and flywool particles at the upper level of the cyclonic separator 16. The entrained materials are preferably discharged tangentially along the upper inner wall of the separator. Because the fiber product 54 is relatively dense, it moves along an outer vortex path as indicated by the arrows 56 downwardly to the bottom of the separator, while the airborne fugitive flywool particles 58, being relatively less dense, are entrained by and travel along an inner vortex 60 induced by the fan blower 46. The bulk fiber product 54 accumulates in the bottom of the collector and is discharged through a rotary valve 62 for further processing, as described hereinafter.

The fugitive flywool particles 58 travel upwardly along the inner vortex path as indicated by the arrows 60 and are entrained within a moving air stream in a conduit 62. According to an important feature of the invention, the flywool particles 58 are removed from the effluent air stream 43 by the filter assembly 18 prior to discharge into the environment.

Figure 4:
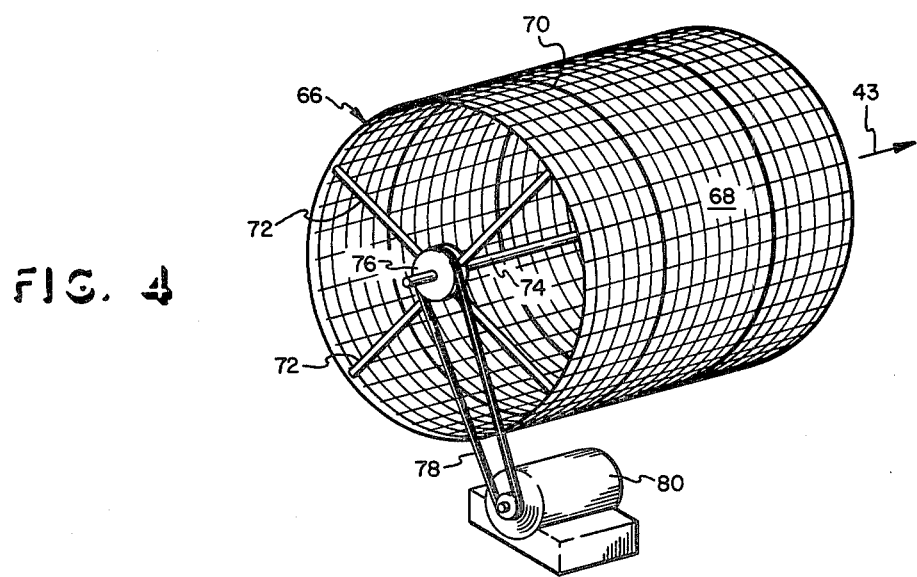
FIG. 4 is a perspective view of a cylindrical screen which forms a part of the filter assembly; and shown in FIG. 3.

Referring now to FIGS. 1, 3 and 4, the filter assembly 18 comprises a filter housing 64 and a drum 66 mounted for rotation within the housing. The drum 66 comprises a cylindrical screen 68 reinforced by circular ribs 70. The cylindrical screen 68 is concentrically supported by spokes 72 on a horizontal shaft 74. The shaft 74 is journalled for rotation on conventional bearing assemblies at each end (not shown). A pulley 76 is secured to one end of the shaft 74 and is driven in rotation by a belt 78 and an electrical motor 80.

The opposite end of the cylindrical screen 68 is closed by a circular screen cover 82 as can best be seen in FIG. 1. The drive pulley end of the drum 66 is left open for discharge of the effluent air stream 43 into the atmosphere. According to an important feature of the invention, the fugitive flywool particles 58 are accumulated as a lint deposit on the surface of the screen 68 as the effluent air stream 43 passes through the screen. For this purpose, the filter housing is provided with an air stream inlet 84, a lint discharge outlet 86, and a clean air outlet 88. As can best be seen in FIG. 11, the effluent air stream inlet port 84 receives air flow in a tangential direction with respect to the surface of the screen 68, and the lint discharge outlet 86 is formed in a downstream housing location near a nip region 90 defined between the screen 66 and the adjacent housing 64. The clean air outlet 88 is, of course, coincident with the open end of the drum 66.

The filter housing 64 outwardly surrounds the screen 68 and defines an annular lint accumulation zone 92 which extends from the inlet port 84 downstream to the lint discharge port 86. The rotatable screen 68 is interposed in the flow path of the effluent air stream whereby the fugitive flywool particles entrained in the air stream are accumulated on the filter surface as the effluent air stream flows through the screen and through the clean air outlet 88. The fugitive particles are accumulated as a lint deposit on the surface of the screen, and the deposit is presented to the lint discharge outlet as the drum turns through the lint accumulation zone.

The screen is cleaned continuously as the accumulated flywool lint deposit is removed by a suction force applied to the lint discharge outlet 86 by a fan blower 94. The fan blower 94 is connected in draft communication with the lint discharge outlet 86 through a flared transition conduit 96. The flared transition portion of the conduit, indicated by the reference numeral 96T, is coextensive with the length of the drum 66. The flywool lint deposit is indicated generally by the arrow 98 and is reintroduced into the cyclonic separator 16 through a return conduit 100. Because the flywool lint deposit is relatively dense compared with the fugitive flywool particles, the lint deposit material settles downwardly along the outer vortex path as indicated by the arrows 56. Any remaining fugitive fly particles are then recirculated through the filter for collection by the screen 66. Thus the fugitive flywool particles are continuously circulated through the filter until they are accumulated in a mass large enough to settle out for discharge through the rotary valve 62.

It will be appreciated that as the larger fugitive particles are deposited over the screen surface, that the lint deposit prevents penetration of the screen by extremely small fly particles. Thus particle emissions through the clean air outlet 88 in this stage is limited to an extremely low level. In order to further reduce the percentage of fugitive flywool particles in the overall product, the fiber product 54 produced by the first stage is processed through a smaller but similar secondary stage 102.

Referring again to FIG. 1, the relatively dense fiber product 54 is discharged from the cyclonic separator 16 through the rotary valve 62 and onto a conveyer 104. The fiber product 54 is transported along the conveyer and is picked up by suction induced within a collector conduit 106. The collector conduit discharges into a secondary cyclonic separator 108 where the relatively dense fiber product 110 travels along an outer vortex path as indicated by the arrows 112, while the relatively less dense fugitive flywool particles 114 travel upwardly along an inner vortex path as indicated by the arrows 116. The inner vortex is induced by the draft created by a fan blower 118 in a manner corresponding to the vortex inducing action of the draft fan 46 as previously discussed. The fugitive particles 114 are accumulated on the screen surface 120 of a rotary drum filter assembly 122. The accumulated lint is reintroduced into the secondary separator 108 by a fan blower 124. The fiber product which settles through the secondary separator is discharged through a rotary valve 126 for further processing in a bagging station 128 where paper bags 130 are filled and sealed in the usual manner.

If desired, the fugitive fly particles need not be reintroduced into the secondary separator 108, but instead may be diverted into a small cyclone separator wherein the flywool is accumulated for disposal rather than returning for mixing with the finished fiber product.

The invention may be embodied in other specific forms without departing from the spirit or essential characteristics thereof. For example, although the filter is preferably embodied in the form of a cylindrical screen, other rotary screen devices may be used to good advantage with only slight system modifications. Therefore the present embodiment should be considered in all respects as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by U.S. Letters Patent is:

1. A cyclonic separator assembly comprising, in combination:
   a vertical settling chamber for separating relatively dense fiber product from airborne lint entrained in an effluent air stream, and a filter assembly coupled to the settling chamber for extracting the entrained lint from the effluent air stream prior to discharge into the atmosphere and for reintroducing the recovered lint into the settling chamber, said filter assembly including a housing forming an air stream inlet and a lint discharge outlet, both coupled to the settling chamber, and a clean air outlet; a rotatable screen interposed between the air stream inlet and the clean air outlet whereby the entrained lint is accumulated on the screen as the effluent air stream flows through the screen and out of the clean air outlet, and whereby the accumulated lint deposit is presented to the lint discharge outlet as the screen turns; a first suction fan having an inlet coupled to the settling chamber for inducing an upwardly moving air flow within the settling chamber for entraining the airborne lint, and having an outlet coupled to the air stream inlet of said filter assembly for discharging the entrained airborne lint onto the rotatable screen; and, a second suction fan having an inlet coupled to the lint discharge outlet for creating a suction force which removes the accumulated lint deposit from the rotatable screen as it turns, and having an outlet coupled to the settling chamber of the separator assembly for discharging the suctioned lint deposit into the settling chamber.

* * * * *